United States Patent
Fisher et al.

(10) Patent No.: US 6,334,191 B1
(45) Date of Patent: Dec. 25, 2001

(54) MULTI-FUNCTION TIMER WITH SHARED HARDWARE

(75) Inventors: Rollie Morris Fisher, LaSalle; Samuel James Guido, Dearborn, both of MI (US); Martin G. Gravenstein, Nevada City, CA (US); Michael Anthony Viigil, Colorado Springs, CO (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/575,045

(22) Filed: May 19, 2000

(51) Int. Cl.[7] ................................................ G06F 1/00
(52) U.S. Cl. ............................................... 713/502
(58) Field of Search .................. 713/502; 709/100–102, 709/107

(56) References Cited

U.S. PATENT DOCUMENTS

| | | |
|---|---|---|
| 4,712,072 * | 12/1987 | Kawanabe ............................ 327/23 |
| 5,631,592 | 5/1997 | Schwarz et al. . |
| 5,799,182 | 8/1998 | Gravenstein et al. . |
| 5,812,833 | 9/1998 | Goler et al. . |
| 5,854,922 | 12/1998 | Gravenstein et al. . |
| 5,893,928 | 4/1999 | Gravenstein et al. . |

* cited by examiner

Primary Examiner—Thomas M. Heckler

(57) ABSTRACT

A multi-function timer used to perform multiple input timing measurements and generate multiple timed output events on the I/O pins of the apparatus. The multi-function timer comprises a plurality of slots and a compute engine. Each of the slots represents one of a plurality of timing processes. The compute engine includes a micro-sequencer and a processor. The micro-sequencer identifies a current slot and associated plurality of instructions representing a process, and is configured to serially sequence through each of the slots. The processor performs the functions of the instructions associated with each current slot. Further, each slot is configured to perform any one of the following timing processes: pulse width modulation, high speed input, high speed output, or delta time input. The multi-function timer is advantageous in that it provides application design flexibility by eliminating the need for dedicated logic for input and output timing functions.

19 Claims, 12 Drawing Sheets

Control Register

| Bit Number | 0 | 1 | 2 | 3 | 4 | 5 | 6 | 7 | 8 | 9-10 | 11 | 12 | 13 | 14-15 | 16-31 |
|---|---|---|---|---|---|---|---|---|---|---|---|---|---|---|---|
| | | Enable | Mode | | TBS | | TWM | SC | | | SE | PWIE | PIE | Edge | |
| Reset | 0 | 0 | 0 | 0 | 0 | 0 | 0 | 0 | 0 | 0 | 0 | 0 | 0 | 0 | 0 |

FIG. 6A

Status Register

| Bit Number | 0-26 | 27 | 28 | 29 | 30 | 31 |
|---|---|---|---|---|---|---|
| | | SS | | | PWS | PS |
| Reset | 0 | 0 | 0 | 0 | 0 | 0 |

FIG. 6B

Data Registers

| | 8 — 31 |
|---|---|
| Data Register 0 | Period |
| Data Register 1 | Pulse Width |
| Data Register 2 | |
| Data Register 3 | Absolute Period Match Time |

FIG. 6C

Control Register

| Bit Number | 0 | 1 | 2 | 3 | 4 | 5 | 6 | 7 | 8 | 9 | 10 | 11 | 12 | 13 | 14 | 15 | 16 | 31 |
|---|---|---|---|---|---|---|---|---|---|---|---|---|---|---|---|---|---|---|
| | | Enable | | Mode | | TBS | TWM | SC | | FEIE | FETE | REIE | RETE | FEIE | REIE | Comp | | |
| Reset | 0 | 0 | 0 | 0 | 0 | 0 | 0 | 0 | 0 | 0 | 0 | 0 | 0 | 0 | 0 | 0 | 0 | 0 |

FIG. 7A

Status Register

| Bit Number | 0 | 27 | 28 | 29 | 30 | 31 |
|---|---|---|---|---|---|---|
| | | | FES | FETS | RES | RETS |
| Reset | 0 | 0 | 0 | 0 | 0 | 0 |

FIG. 7B

Data Register

| | 1 | 31 |
|---|---|---|
| Data Register 0 | Rising Edge Time on Hold | |
| Data Register 1 | Rising Edge Time for Match | |
| Data Register 2 | Falling Edge Time on Hold | |
| Data Register 3 | Falling Edge Time for Match | |

FIG. 7C

Control Register

| Bit Number | 0 | 1 | 2 | 3 | 4 | 5 | 6 | 7 | 8 | 9 | 10 | 11 | 12 | 13 | 14 | 15 | 16 | 23 | 24 | 31 |
|---|---|---|---|---|---|---|---|---|---|---|---|---|---|---|---|---|---|---|---|---|
| | | | Enable | Mode | | TBS | TWM | SC | | DOVIE | DVOIE | DVIIE | SPIE | COVIE | Edge | | SP | | | |
| Reset | 0 | 0 | 0 | 0 | 0 | 0 | 0 | 0 | 0 | 0 | 0 | 0 | 0 | 0 | 0 | 0 | 0 | 0 | 0 | 0 |

FIG 8A

Status Register

| Bit Number | 0 | 25 | 26 | 27 | 28 | 29 | 30 | 31 |
|---|---|---|---|---|---|---|---|---|
| | | | SPS | DVOS | DVIS | | COVS | DOVS |
| Reset | 0 | 0 | 0 | 0 | 0 | 0 | 0 | 0 |

FIG 8B

Data Registers

| Register Name | | | |
|---|---|---|---|
| Data Register 0 | Delta Time (t) | | |
| Data Register 1 | Delta Time (t-1) | | |
| Data Register 2 | counter for DT (t+1) | # of input events (t) | # of input events (t-1) |
| Data Register 3 | Last Absolute Capture Time | | |

FIG 8C

Control Register

| Bit Number | 0 1 | 2 | 3 4 | 5 | 6 | 7 | 8 | 9 | 10 | 11 | 12 | 13 | 14 15 | 16 23 | 24 31 |
|---|---|---|---|---|---|---|---|---|---|---|---|---|---|---|---|
| | | Enable | Mode | TBS | TWM | SC | | DOVIE | DV0IE | DV1IE | DV2IE | DV3IE | Edge | PS | |
| Reset | 0 0 | 0 | 0 0 | 0 | 0 | 0 | 0 | 0 | 0 | 0 | 0 | 0 | 0 0 | 0 0 | 0 0 |

FIG 9A

Status Register

| Bit Number | 0 | 25 | 26 | 27 | 28 | 29 | 30 | 31 |
|---|---|---|---|---|---|---|---|---|
| | | | CES | DV0S | DV1S | DV2S | DV3S | DOVS |
| Reset | 0 | 0 | 0 | 0 | 0 | 0 | 0 | 0 |

FIG 9B

Data Registers

| | 8 | 31 |
|---|---|---|
| Data Register 0 | | Capture Time (t) |
| Data Register 1 | | Capture Time (t-1) |
| Data Register 2 | | Capture Time (t-2) |
| Data Register 3 | | Capture Time (t-3) |

FIG 9C

MULTI-FUNCTION TIMER WITH SHARED HARDWARE

BACKGROUND OF THE INVENTION

The present invention relates, generally, to digital processors, and more specifically, to a multi-function timer with shared hardware for microprocessor-based engine control applications.

Micro-sequencers have commonly been used to sequence through instructions and data for processor usage in a digital system, such as a computer-based system. A difficulty of multiple digital signal input/output functionality implemented by a single micro-sequencer has been the ability of the sequencer to process multiple inputs/outputs with a high degree of resolution. The resolution is generally limited by the instruction throughput of the sequencer coupled with the complexity of the input/output functions. This limitation may result in a latency to reacting to a new input/output events while processing the most current event.

Current systems have typically dedicated a single algorithm in hardware to a single pin in a digital system. Also, in order to utilize different algorithms on the same pin, some systems have stored all potential algorithms with a pin and selection of only one of the algorithms is assigned to the pin. One disadvantage with these systems is that only one algorithm may be utilized on the input/output data at the pin. In other words, in systems such as microprocessor-based engine control systems, separate, dedicated circuits are used to generate multiple timed output events on dedicated output pins, and to perform multiple input timing measurements on dedicated input pins. Disadvantages of such systems include limited design flexibility in terms of die size, pin usage and hardware. Also, another disadvantage is that there is wasted circuitry hardware in the case of multiple algorithms on a selected pin in that only one algorithm will be utilized.

SUMMARY OF THE INVENTION

It is, therefore, an object of the invention to provide a microsequencer design using shared hardware to generate multiple timed output events and to perform multiple input timing measurements on the input/output pins of the device.

According to the present invention, the foregoing and other objects and advantages are attained by a multi-function timer comprising a plurality of slots and a compute engine. Each of the slots represents one of a plurality of timing processes, and the compute engine includes a microsequencer and a processor. The microsequencer identifies a current slot and associated plurality of instructions representing a process, and is configured to serially sequence through each of the slots. The processor performs the functions of the instructions associated with each current slot. Further, each slot is configured to perform any one of the following timing processes: pulse width modulation, high speed input, high speed output, or delta time input.

One advantage is that the present invention is capable of generating multiple timed output events and performing multiple input timing measurements using shared hardware in a microsequencer design. Another advantage is that the present invention simplifies the design of the timer and provides more flexibility in pin usage. An additional advantage is that the multi-function timer minimizes the amount of software and hardware overhead required by the host processor for input/output functions.

Other objects and advantages will become apparent upon reading the following detailed description and appended claims and upon reference to the accompany drawings.

BRIEF DESCRIPTION OF THE DRAWINGS

The above object and advantages of the invention will be more clearly understood by reading an example of an embodiment in which the invention is used to advantage with reference to the attached drawings wherein:

FIGS. 6A, 6B, 6C are block diagrams of the slot registers in PWM modes.

FIGS. 7A, 7B, 7C are block diagrams of the slot registers in HSO mode.

FIGS. 8A, 8B, 8C are block diagrams of the slot registers in DTI mode.

FIGS. 9A, 9B, 9C are block diagrams of the slot registers in HSI mode.

DESCRIPTION OF THE PREFERRED EMBODIMENT(S)

Figure 1:
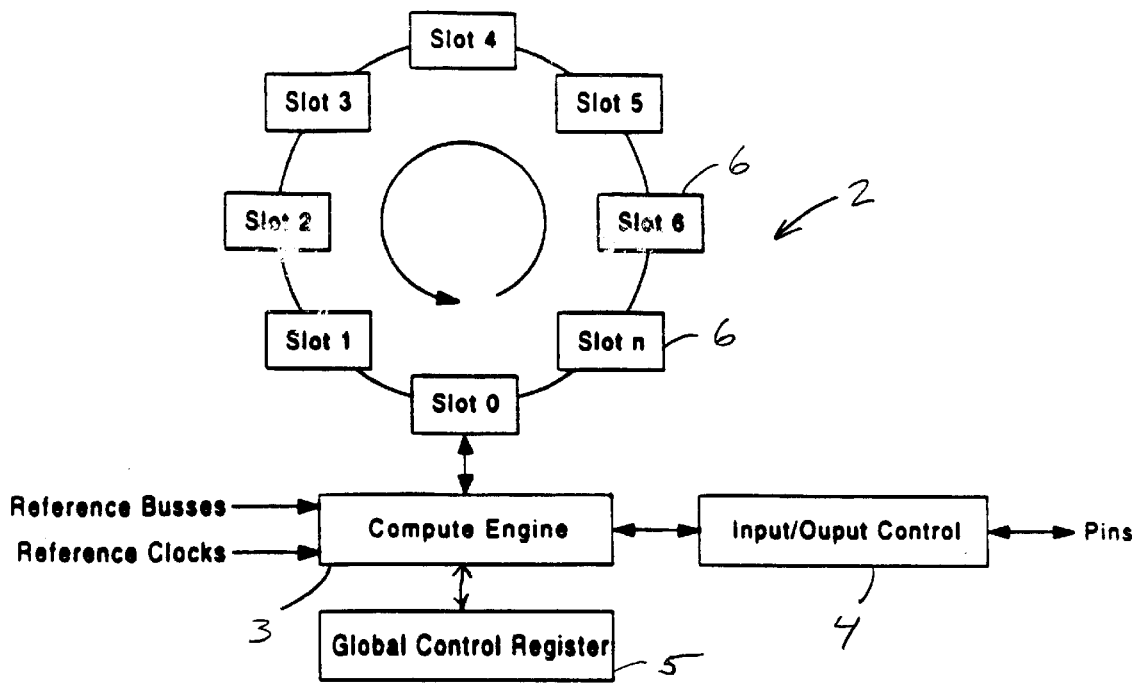
FIG. 1 is a block diagram of the micro-function timer apparatus of the present invention.

Referring now to FIG. 1, there is shown a block diagram of one embodiment of the multi-function timer of the present invention. The multi-function time 2 implements a microsequencer state machine design which includes a common compute engine 3, input/output control logic 4, a global control register 5, and a plurality of slots 6.

Figure 2:
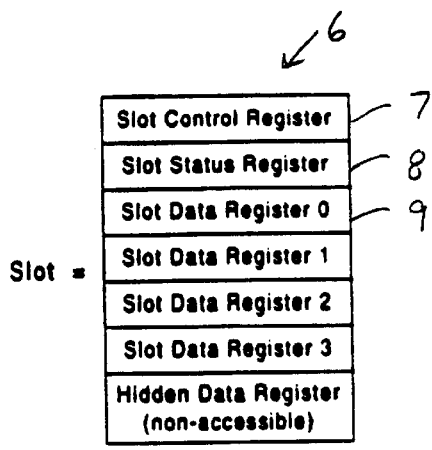
FIG. 2 is a block diagram of a representative slot of FIG. 1.

As shown in FIG. 2, each slot 6 contains a control register 7, a status register 8 and a plurality of data registers 9. The slots 6 may also include a hidden data register. These hidden data registers act as a slot-specific scratch pad registers to hold intermediate data determinations The function of the registers 7, 8, 9 changes depending upon the operating mode of the slot 6.

Referring again to FIG. 1, each slot is serviced by the sequencer of the compute engine in a round-robin fashion. Further, each slot is preferably associated with one device pin. The compute engine 3, control logic 4, and global registers 5, are shared by all slots 6 to achieve a smaller package and more cost-effective implementation.

The multi-function timer 2 of FIG. 1 is flexible in that any number of slots 6 can be included, as well as any number of data registers 9 for each slot 6. In this way, for example, the multi-function timer could include eight slots having four data registers each. Preferably, each slot 6 of the multi-function timer supports four modes of operation and each can be configured independently for any one of these modes. The four modes are: timed high speed input (HSI), timed high speed output (HSO), pulse width modulation (PWM) and sample-based delta time interval (DTI). Because each slot is physically identical and can support any of the four operating modes, the number of different input/output types in hardware is reduced and the flexibility of the multi-function timer at the application level is increased relative to prior systems.

One example of a microsequencer apparatus of the type that can be used to implement the multi-function timer of FIG. 1 is described in U.S. Pat. No. 5,799,182, incorporated herein by reference.

Figure 3:
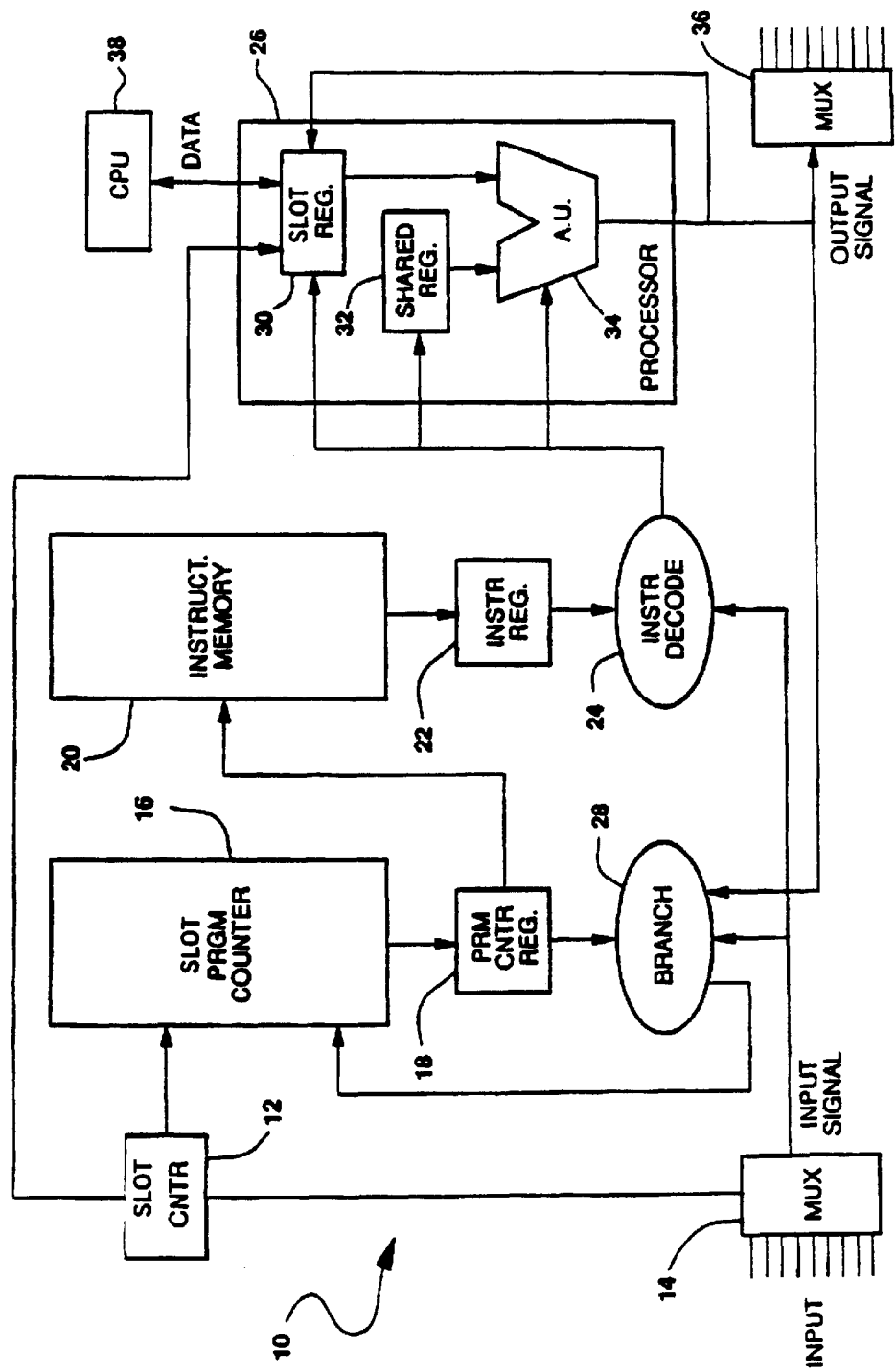
FIG. 3 is a block diagram of another embodiment of multi-function timer according to the present invention.

Micro-sequencer apparatus 10 is illustrated in FIG. 3. Micro-sequencer apparatus 10 is utilized for processing multiple slots including multiple data and multiple instructions. Each slot operates independently from the other slots and utilizes same or different algorithms for processing its own data.

Micro-sequencer apparatus 10 includes slot counter 12 for identifying a current slot from a plurality of slots to produce a slot signal representative of the current slot. The identification of the current slot allows processing of the instructions and data associated therewith, which processing is often different from the remainder of slots. Slot counter 12 also determines the subsequent sequence of each of the plurality of slots for identification as subsequent current slot, and also identifies input associated with the current slot. Slot counter 12 is preferably a simple sequencer which continuously sequences through each of the slots in the same order, e.g., 1, 2, 3, 1, 2 . . .

Micro-sequencer apparatus 10 also includes input multiplexer 14 connected to a plurality of input signals for selecting one input signal for use in micro-sequencer apparatus 10 based on slot counter 12 and the current slot. Each slot is associated with one of the input signals of input multiplexer 14. Therefore, when it is the turn of each slot, the appropriate input signal will be transferred from input multiplexer 14 for use as subsequently discussed.

Micro-sequencer apparatus 10 also includes slot program counter 16 for storing a program count for each of the plurality of slots since each slot operates independently from the other slots. The program count for the current slot is generally different than the program count for a subsequent slot. Slot program counter 16 also receives the slot signal from slot counter 12 to produce the program count for the current slot.

Micro-sequencer apparatus 10 also includes program counter register 18 for storing the program count from slot program counter 16. Instruction memory 20 stores at least one algorithm having a plurality of instructions. In one embodiment, a plurality of algorithms are stored in instruction memory 20, each having a plurality of instructions. Each of the slots may be associated with different algorithms or may utilize a common algorithm. However, even when using a common algorithm, each slot may be at a different program count or instruction position. Instruction memory 20 also receives the program count to designate a current instruction. The program count provides an address to point to the current instruction in a particular algorithm in instruction memory 20. The current instruction is transferred to and stored in instruction register 22 for processing.

Instruction decoder 24 receives the instruction from instruction register 22 and also receives the associated input signal from input multiplexer 14 for the particular slot. The instruction decoder 24 decodes the current instruction and input signal for use by processor 26. Processor 26 receives the decoded current instruction and performs the function of the current instruction with the associated input signal to produce an output signal based thereon. The input may be comprised of either or both the input signal for the slot and input data, as subsequently discussed. The output may be comprised of either or both the output signal and output data, as also subsequently discussed.

The output signal from processor 26 is received by output multiplexer 36 which transfers the single output signal from processor 26 to a plurality of output signal lines, generally one for each slot. The timer may communicate with a central processing unit (CPU) 38 which communicates with processor 26 to provide the input data and/or obtain the output data.

Micro-sequencer apparatus 10 also includes branch logic circuit 28 for receiving the output signal, input signal, and current program count and for producing the next program count for the current slot and for storing same in slot program counter 16, which concludes operations on the current slot. Thereafter, slot counter 12 increments to the next slot for processing one of its instructions.

Processor 26 includes a plurality of slot registers 30, each being uniquely associated with one of the slots. Slot registers 30 include a plurality of registers associated with the different slots, and receive the slot signal to activate only those registers associated with the current slot. There may be one or multiple registers associated with a single slot. This allows information to be stored for a particular slot and unused by other slots. Slot registers 30 store any input data from CPU 38 to be used in subsequent processing or to be obtained by CPU 38, as required by the algorithm.

Processor 26 also includes shared registers 32 which include a plurality of registers which may be utilized during processing of any of the slots. In other words, the shared registers 32 are not associated with any particular slot and are reused during each subsequent slot processing. Therefore, information can not be stored and retrieved by a subsequent instruction of a single slot since each slot executing an instruction in a cycle may use and overwrite the register 32. These are merely temporary registers.

Processor 26 includes arithmetic unit 34 for processing the current instruction with the input signal and input data in slot registers 30, as commonly known in the art. The arithmetic unit 34 operates comparisons, additions, etc. The output of such processing may be stored in unique slot registers 30 and/or the processing result is provided as the output signal.

For example, as shown in FIG. 1, there may be eight different slots in micro-sequencer apparatus 10 of FIG. 3. In one embodiment, slot counter 12 sequences through each of the eight slots, 1, 2, . . . 7, 8, and performs one of their instructions each time, and then repeats. In this manner, each slot is allowed to execute a single instruction and then waits for the next cycle. Instruction memory 20 preferably includes four different algorithms which are utilized by the eight slots. Specifically, instruction memory includes timing algorithms for HSI, HSO, PWM and DTI. Each of the eight slots may use any of the algorithms with some slots using the same algorithms, or less than all of the algorithms may be used. However, each slot may operate at a different position in the instruction memory 20 through operating within a common algorithm, so that each slot operates independently from the remaining slots.

Figure 4:
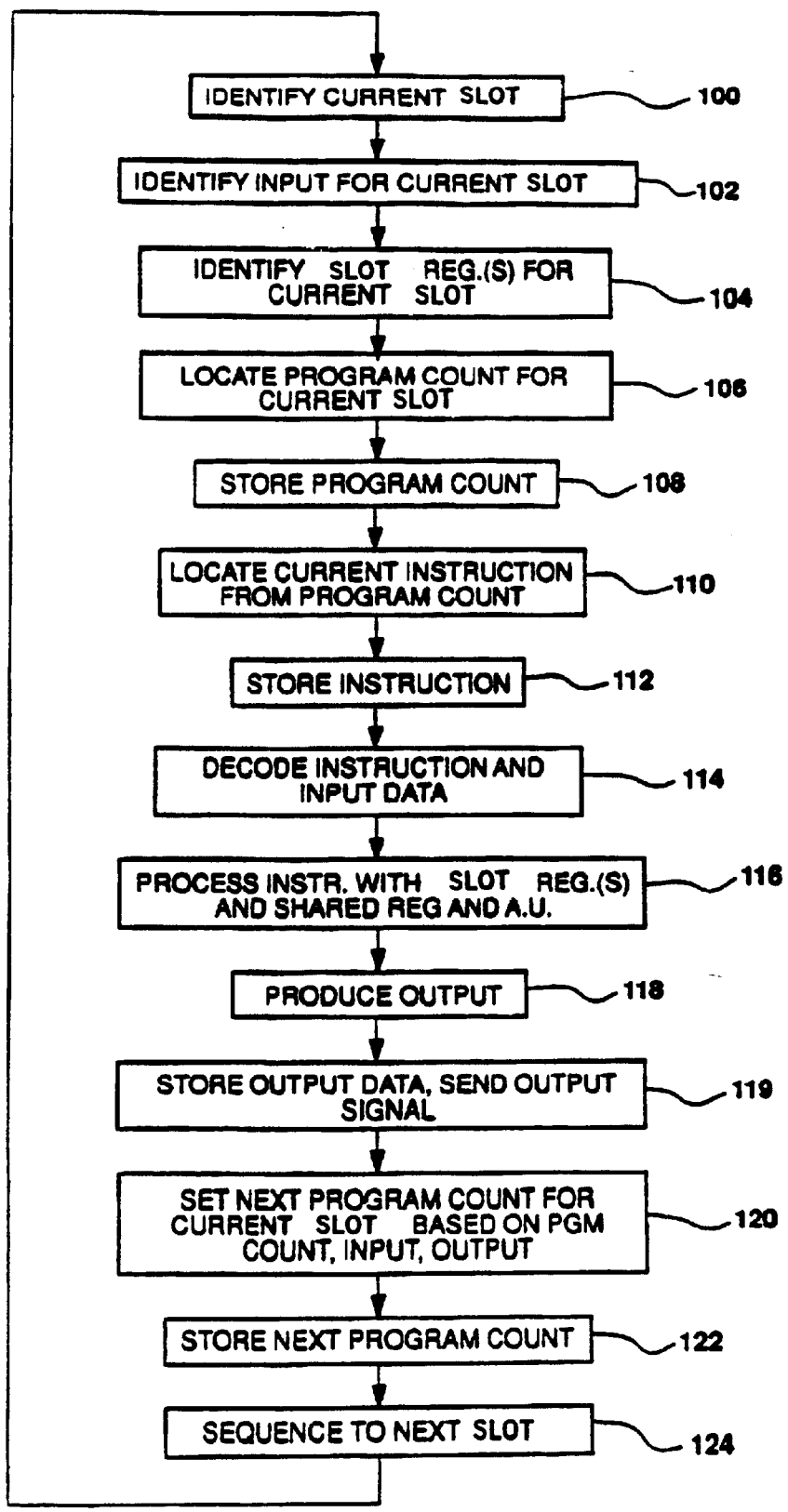
FIG. 4 is a logic flow diagram of the operation of the apparatus of FIG. 3.

FIG. 4 illustrates a flow chart of the micro-sequencer apparatus 10. The flow chart starts in block 100 where the current slot is identified. Thereafter, the associated input signal from the multiplexer 14 for the current slot is identified in block 102. Concurrently, slot registers 30 for the current slot in processor 26 are also identified in block 104.

The program count of slot program counter 16 is located for the current slot in block 106. The program count is stored in the program counter register 18 in block 108. The current instruction is located in instruction memory 20 based on the program count in block 110. The instruction is stored in instruction register 22 in block 112. The instruction and input data is decoded by instruction decoder 24 in block 114. The instruction is processed with its respective slot registers 30 and shared data registers 32 and arithmetic unit 34 in block 116. The processing results in producing an output in block 118. The output data is stored in slot registers 30 and/or the output signal provided to output mix 36 in block 119. Thereafter, the next program count is set for the current slot based on the output, input and current program count by branch logic circuit 28 in block 120. The next program count is stored in slot program counter 16 in block 122. Thereafter, the next slot is sequenced in block 124 and the steps are repeated for the next slot.

It should also be appreciated that the micro-sequencer apparatus 10 may be modified to execute more than one instruction during its slot's twin in the cycle. In other words, the first slot may execute two instructions, then the second slot executes two instructions, etc. Such operation may be implemented by a loop in program counter register 18 to cycle through two instructions.

Figure 5:
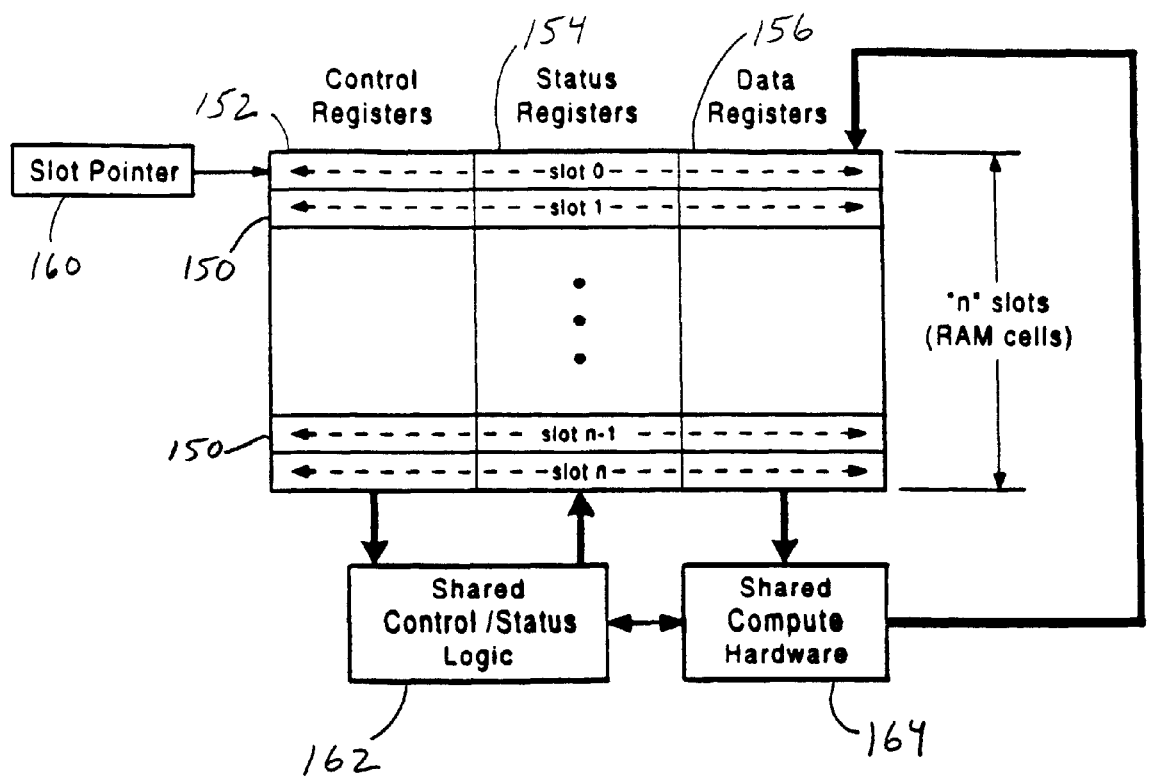
FIG. 5 is a block diagram of another embodiment of a multi-function timer according to the present invention.

FIG. 5 shows a schematic diagram of another embodiment of the multi-function timer according to the present invention. Like FIG. 2, each slot 150 includes a control register 152, a status register 154, and one or more data registers 156. Preferably, the control registers 152, status registers 154 and data registers 156 are constructed from read/write RAM cells.

A slot pointer 160 which acts as a simple counter, selects the registers of a slot for processing by the shared control/status logic 162 and shared compute hardware 164. The control registers 152 of the slots 150 configure the shared control/status logic 162 and shared compute hardware 164 which performs the selected functional mode of the active slot 150. The implementation of RAM and shared logic and hardware in this arrangement is advantageous in that it significantly reduces the circuit size as compared to prior systems.

The operation of the multi-function timer will now be described with reference to FIG. 1. In the example described herein, the multi-function timer contains eight slots, each of which is associated with one pin. Each slot supports four modes of operation (PWM, HSO, DTI and HSI) and can be configured independently for any one of these modes.

In PWM mode, the multi-function timer slot generates a square wave on its associated pin line. The duty cycle of the wave form depends on two time values, the pulse width and the period, stored in the data registers of the slot. In single mode, the slot generates one period and then stops; in continuous mode, the slot produces a continuous wave form.

In HSO mode, the multi-function timer slot generates a programmed edge event on its associated pin line at a defined time. This time is determined by time values, referred to as match times, stored in the slot data registers. The match times are compared to the current value of the reference timer bus. At the occurrence of a match, the programmed edge event is generated on its associated pin line. In single mode, the slot generates up to four edge events; in continuous mode, it produces edge events as long as it is enabled.

In DTI mode, which is sample period based, the multi-function timer slot calculates the time difference (delta time) between two qualified input events on the associated pin line, and counts the number of input events within that delta time period. The delta times are preferably stored in a two-deep FIFO buffer. In single mode, the slot fills the FIFO with delta times and then stops; any newly calculated delta times are lost until the CPU empties the FIFO. In continuous mode, the slot shifts the delta times through the FIFO buffer such that the older delta time is lost if the CPU does not empty the FIFO buffer.

In HSI mode, which is prescalar based, the multi-function timer slot captures time values off the reference timer bus at specified input events. The capture times are stored in a four-deep FIFO buffer. In single mode, the slot fills up the FIFO with capture times and then stops; any newly captured times are lost until the CPU empties the FIFO buffer. In continuous mode, the slot shifts the time values through the FIFO buffer such that the oldest capture time is lost if the CPU does not empty the FIFO buffer.

The slot register configuration for each of the operating modes will now be described with reference to FIGS. 6–9. Referring first to FIGS. 6a, 7a, 8a, and 9a, five bits in each slot control register are independent of the mode. In other words, they have the same definition in all four modes. These bits are: Enable, Mode, Time Base Select (TBS), Time Width Mask (TWM), and Single/Continuous (SC). The Enable bit allows the slot to start operation or disables the slot to stop operation. The Mode bit is a two-bit field which selects the mode of operation for the slot. All slots are programmable independently in any of the four operating modes. The TBS bit selects the time base for the slot from the possible time bases available on the reference timer bus. The TWM determines locally for the slot data size of the timer bus value to perform timing functions. The SC bit programs the slot in either single or continuous mode as described above. The remaining bits in each slot control register have mode-dependent definitions.

FIG. 6a depicts the configuration of the control register for a slot in PWM mode. The mode dependent bits are: Synchronization Enable (SE), Pulse Width Interrupt Enable (PWIE), Period Interrupt Enable (PIE), and Edge. The SE bit determines whether the output wave form of the slot begins when the slot is enable or at a time specified by the value in the data register which is described below with reference to FIG. 6c. The PWIE bit controls the toggling of the status line in the event of a pulse width completion. The PIE bit controls the toggling of the status line in the event of a period completion. The edge bit is a two-bit field which determines the output level the slot generates on the associated pin.

FIG. 6b shows the configuration of the status register of a slot in PWM mode. The Start Status (SS) bit indicates whether the slot has begun operating. The multi-function timer sets this bit at the beginning of the first period after the slot has been enabled, and clears the bit when the slot is disabled, when the period status bit is set while the slot is in single mode, or when the mode bit field in the control register changes. The Pulse Width Status (PWS) bit is set each time a pulse width is completed. This bit is cleared when the Mode bit field in the control register changes. The Period Status (PS) bit is set each time a period is completed. This bit is cleared when the Mode bit field in the control register changes.

The configuration of the data register in PWM mode is shown in FIG. 6c. Data register zero holds the period of the square wave, data register one contains the pulse width of the square wave, and data register three stores the absolute period match time. This time is the calculated timer bus value at which the pending period match will occur.

The slot registers in high speed output mode will now be described with reference to FIGS. 7a, 7b and 7c. The configuration of the control register in HSO mode is shown in FIG. 7a. The mode dependent bits are Falling Edge Enable (FEE), Falling Edge Time Transfer Enable (FETE), Rising Edge Enable (REE), Rising Edge Time Transfer Enable (RETE), Falling Edge Interrupt Enable (FEIE), Rising Edge Interrupt Enable (REIE), and Comparator. The FEE bit controls whether the multi-function timer takes action when a match occurs between the timer bus value and the falling match time in data register three. The FETE bit determines whether the falling match time and data register two is transferred to data register three when a match has occurred from data register three. The REE bit controls whether the multi-function timer takes action when a match occurs between the timer bus value and the rising match time in data register one. The RETE bit determines whether the rising match time and data register zero is transferred to data register one when a match has occurred from data register one. The FEIE bit controls the toggling of the status line in the event of a match between the timer bus value and the falling match time in data register three. The REIE bit controls the toggling of the status line in the event of a match between the timer bus value and the rising match time in data register one. The comparator bit selects the comparator function controlling the match event, e.g., equal to or greater than or equal to.

The configuration of the status register in HSO mode is shown in FIG. 7b. The status register bits in HSO mode are: Falling Edge Status (FES), Falling Edge Time Transfer Status (FETS), Rising Edge Status (RES), and Rising Edge Time Transfer Status (RETS). The FES bit is set by the multi-function timer once when a match condition exists with the timer bus and the value in data register three and no data is transferred from data register two to data register three. The FETS bit is set each time the falling edge match time in data register two is transferred to data register three. The rising edge status bits operate in a similar fashion but with respect to a rising edge match.

The data registers in HSO mode are shown in FIG. 7c. Data registers zero and one each hold a rising match time; data registers two and three each contain a falling match time. Timer bus values are only compared to the time values in data registers one and three. The other two registers function as holding registers.

FIG. 8a shows the control register configuration for DTI mode. The mode dependant bits of the control register are: Data Overflow Interrupt Enable (DOVIE), Data Valid Zero Interrupt Enable (DV0IE), Data Valid One Interrupt Enable (DV1IE), Sample Period Interrupt Enable (SPIE), Counter Overflow Interrupt Enable (COVIE), Edge, Sample Period (SP). The DOVIE bit controls the toggling of the status line in the event of data loss from the FIFO buffer. The DV0IE bit controls the toggling of the status line in the event the multi-function timer stores a new delta time and data register zero. The DV1IE bit works in a similar manner. The SPIE bit controls the toggling of the status line in the event of a sample period completion. The COVIE bit controls the toggling of the status line in the event of an overflow in the counter which determines the number of qualified input events in the current delta time. The edge variable is a two-bit field that programs which edge on the pin line qualifies as an input event, i.e., the rising edge, falling edge, or either the rising edge or falling edge. The sample period is an eight-bit value representing a time interval. The multi-function timer aligns the start of the sample period with a qualified input event. The first qualified input event after completion of the sample period marks the upper end of the delta time.

FIG. 8b shows the status register of the slots in DTI mode. The status register bits which are affected in the DTI mode are as follows: Sample Period Status (SPS), Data Overflow Status (DOVS), Data Valid Zero Status (DV0S), Data Valid One Status (DV1S), Counter Overflow Status (COVS). The SPS bit is set by the multi-function timer each time a sample period is completed. This bit is cleared on the next qualified edge, when the enable bit in the control register changes from zero to one, or when the mode bit field in the control register changes to another mode. The DOVS bit is set each time the delta time is lost from the FIFO buffer, which corresponds to a new delta time in the single mode or older delta time in the continuous mode. This bit is cleared when the mode field bit in the control register changes. The status bit DV0S and DV1S are set each time the multi-function timer writes a new delta time to data register zero or data register 1, respectively. The COVS bit indicates whether an overflow of the delta time event counter has occurred since the last clearing of the bit.

FIG. 8c shows the configuration of the data registers for each slot in DTI mode. Data registers zero and one comprise a two-deep FIFO. Each of the two registers stores a delta time. If the FIFO is full, then data register zero holds the most recent delta time and data register one stores the older delta time. Data register two contains three bite values representing path and current input event counts. Data register three contains the last absolute capture time, i.e., the time of the first qualified input event after the last sample period completion. All of these registers are read-only by the CPU.

The slot register configuration in HSI mode will now be described with reference to FIGS. 9a, 9b, and 9c. The configuration of the control register in HSI mode is shown in FIG. 9a. The mode dependant bits for HSI mode in the control register are as follows: Data Overflow Interrupt Enable (DOVIE), Data Valid Zero Interrupt Enable (DV0IE), Data Valid One Interrupt Enable (DV1IE), Data Valid Two Interrupt Enable (DV2IE), Data Valid Three Interrupt Enable (DV3IE), Edge, Prescalar (PS). The DOVIE bit controls the toggling of the status line in the event of data loss from the FIFO. The bits DV0IE, DV1IE, DV2IE, and DV3IE, control the toggling of the status line in the event the multi-function timer stores a new capture time in data registers zero, one, two or three, respectively. The edge variable is a two-bit field that programs which edge on the pin line qualifies as an input event, i.e., the rising edge, falling edge, or either the rising edge or falling edge. The PS variable is an eight-bit field that determines the number of qualified input events that are skipped between two captured times.

The configuration of the status register in HSI mode is shown in FIG. 9b. The Capture Edge Status (CES) bit indicates the edge on which the most recently obtained time value was captured. The Data Overflow Status (DOVS) bit is set each time a capture time is lost from the FIFO. This bit is cleared when the mode bit field and the control register changes. The data valid status bits (DV0S, DV1S, DV2S, DV3S) are set each time the multi-function timer writes a new capture time to the respective data register.

FIG. 9c shows the configuration of the data registers in HSI mode. The four data registers comprise a four-deep FIFO. This data bit FIFO is shown in FIG. 9c wherein data register zero holds the most recently captured time, data register one stores the time obtained input events before the time value and data register zero, data register two contains the time captured input events before the time value and data register one, and data register three holds the oldest capture time. All of the data registers are preferably read-only by the CPU.

Figure 10:
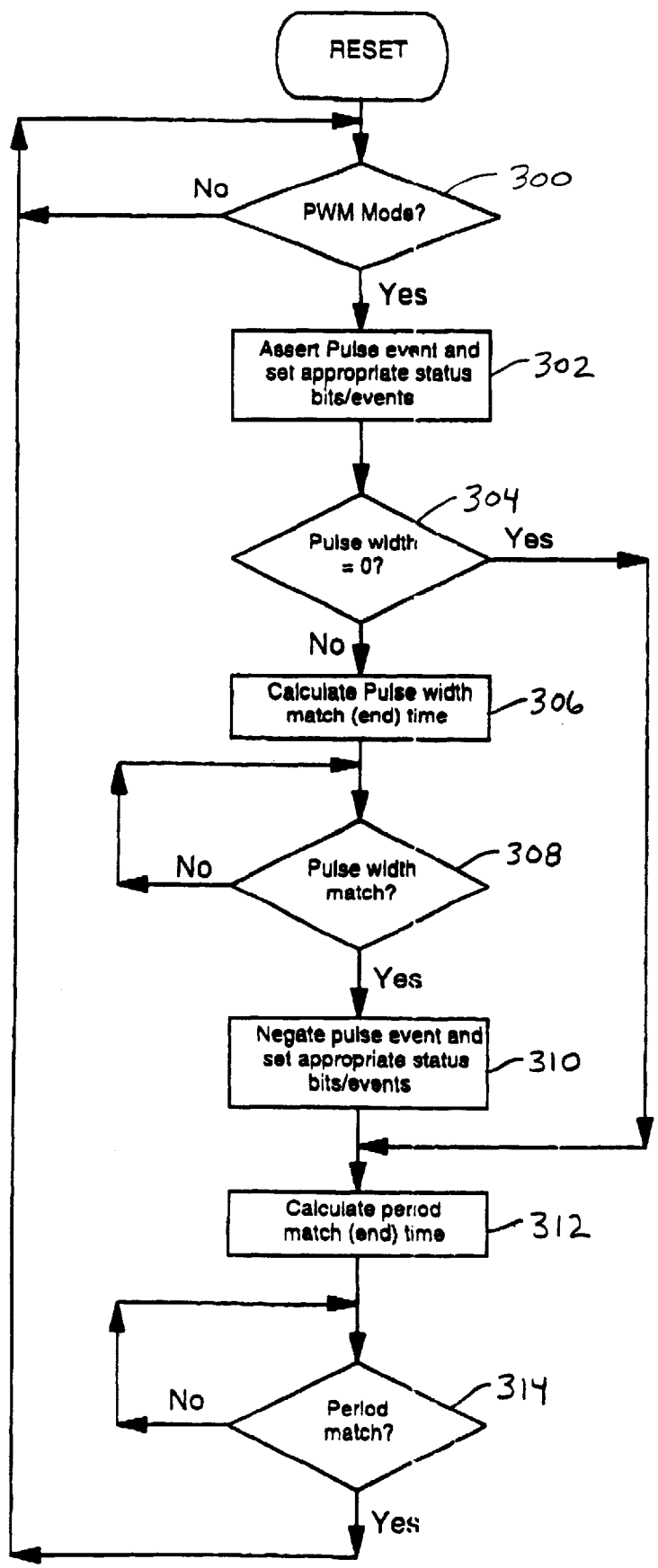
FIG. 10 is a logic flow diagram of the slot operation in PWM mode.

The slot operation in PWM mode will now be described with reference to the logic flow diagram shown in FIG. 10.

The slot starts operation at step 300 when the Enable bit in the slot control register is set and the Mode bit field in the control register indicates that the slot is operating in the PWM mode. In step 302, the pulse event is asserted and the corresponding status and event bits are set in the status and data registers of the slot. If the pulse width is other than zero, in step 304, the program continues to steps 306 and 308, where the pulse is continued until the predetermined match time. Thereafter, the pulse is negated and the corresponding status and data bits are set accordingly. The period match is then determined in step 312 and continues until a period match occurs as determined in step 314.

Figure 11:
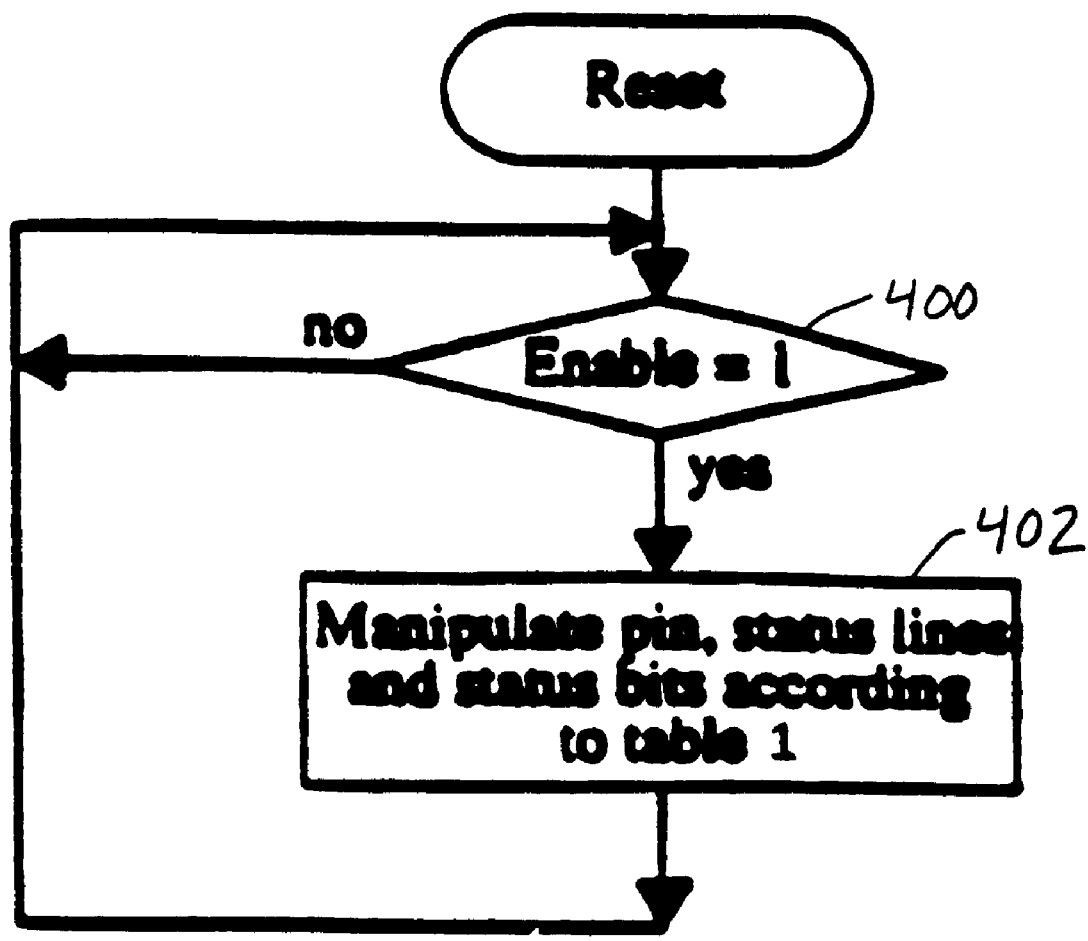
FIG. 11 is a logic flow diagram of the slot operation in HSO mode.

The operation of a slot in HSO mode will now be described with reference to FIG. 11. The slot starts operation in HSO mode when the enabled bit in the control register is set, the mode bit field in the control register is programmed to HSO mode as shown in step 400. If enabled, the slot operates in accordance with table 1 in step 402. Table 1 shows how the multi-function timer changes the pins, status lines, and status bits during slot operation in the HSO mode.

TABLE 1

HSO OPERATION TABLE

| Present State | | | | | |
|---|---|---|---|---|---|
| FEE REE | FETE RETE | SC | FES RES | FETS RETS | Action Taken |
| 0 | | | | | None |
| 1 | 0 | 0 | | | if match: set FES/RES, vote low/high on pin, if (FEIE or REIE) toggle status line |
| 1 | 0 | 1 | 0 | | if match: set FES/RES, vote low/high on pin, if (FEIE or REIE) toggle status line |
| 1 | 0 | 1 | 1 | | None |
| 1 | 1 | 0 | 0 | 0 | If match: set FETS/RETS, vote low/high on pin, transfer data, if (FEIE or REIE) toggle status line |
| 1 | 1 | 0 | 0 | 1 | if match: set FES/RES, vote low/high on pin, transfer data, if (FEIE or REIE) toggle status line |
| 1 | 1 | 0 | 1 | 0 | Clear FES/RES, set FETS/RETS, transfer data; if match: vote low/high on pin, if (FEIE or REIE) toggle status line |
| 1 | 1 | 0 | 1 | 1 | if match: vote low/high on pin, transfer data, if (FEIE or REIE) toggle status line |
| 1 | 1 | 1 | 0 | 0 | if match: set FES/RES, vote low/high on pin, if (FEIE or REIE) toggle status line |
| 1 | 1 | 1 | 0 | 1 | if match: set FES/RES, vote low/high on pin, if (FEIE or REIE) toggle status line |
| 1 | 1 | 1 | 1 | 0 | clear FES/RES, set FETS/RETS, transfer data |
| 1 | 1 | 1 | 1 | 1 | None |

Figure 12:
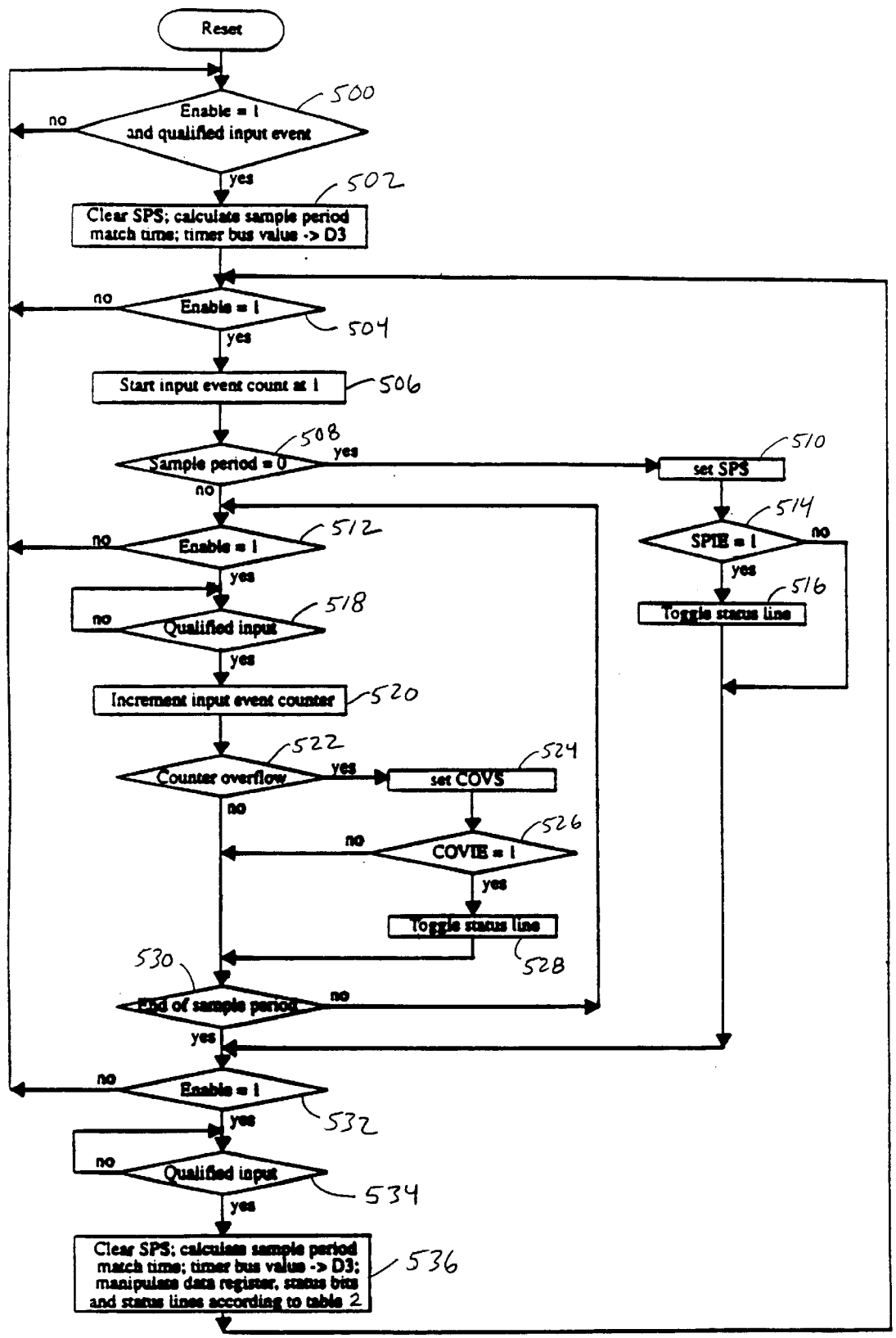
FIG. 12 is a logic flow diagram of the slot operation in DTI mode.

Slot operation in DTI mode will now be described with reference to FIG. 12. If the enabled bit is set and the mode bit is configured to operate the slot in DTI mode as shown in step 500, the sample period status (STS) bit is cleared, the sample period match time is calculated, and the reference timer bus value is stored in data register three as shown in step 502. In the next pass by the sequencer (in this example where there are eight slots, this would correspond to sixteen clock cycles), the enabled bit is again tested in step 504 and, if set, the input event counter is started at 1, as shown in step 506. If the sample period is equal to zero (step 508), the sample period status bit is set in step 510, otherwise, the enable bit is again tested in step 512. After the sample period status bit is set, the sample period interrupt enable (SPIE) bit is tested in step 514 and the status line is toggled accordingly in step 516.

In step 518, it is determined whether a qualified input has been detected. Upon the occurrence of a qualified input, the input event counter is incremented in step 520. The logic then continues to step 522 where in the event of a counter overflow, the counter overflow status bit is set in step 524 and the counter overflow interrupt enable bit is tested in step 526 with the status line being toggled accordingly in step 528. The input event subroutine then continues until the end of the sample period at step 530.

The logic continues in step 532 by again testing the enable bit and detecting a qualified input at step 534. Upon the detection of a qualified input, the sample period status bit is cleared, the sample period match time is determined, the timer plus value is stored in data register three, and the data register status bit and status lines are then manipulated in accordance with Table 2 as shown in step 536.

TABLE 2

WILLING THE FIFO IN DTI MODE

| Present State | | | |
|---|---|---|---|
| DV1S | DV0S | SC | Action Taken |
| 0 | | | Store new delta time in D1, store input event count in D2, set DV1S, if (DV1IE) toggle status line; |
| 1 | 0 | | Store new delta time D0, store input event count in D2, set DV0S, if (DV0IE) toggle status line; |
| 1 | 1 | 0 | Move contents of D0 to D1, store new delta time in D0, move contents of DE to D2, store new input event count in D2 {24:31}, set DOVS, if (DVOIE or DOVIE) toggle status line; |
| 1 | 1 | 1 | Set DOVS, if (DOVIE) toggle status line; |

Figure 13:
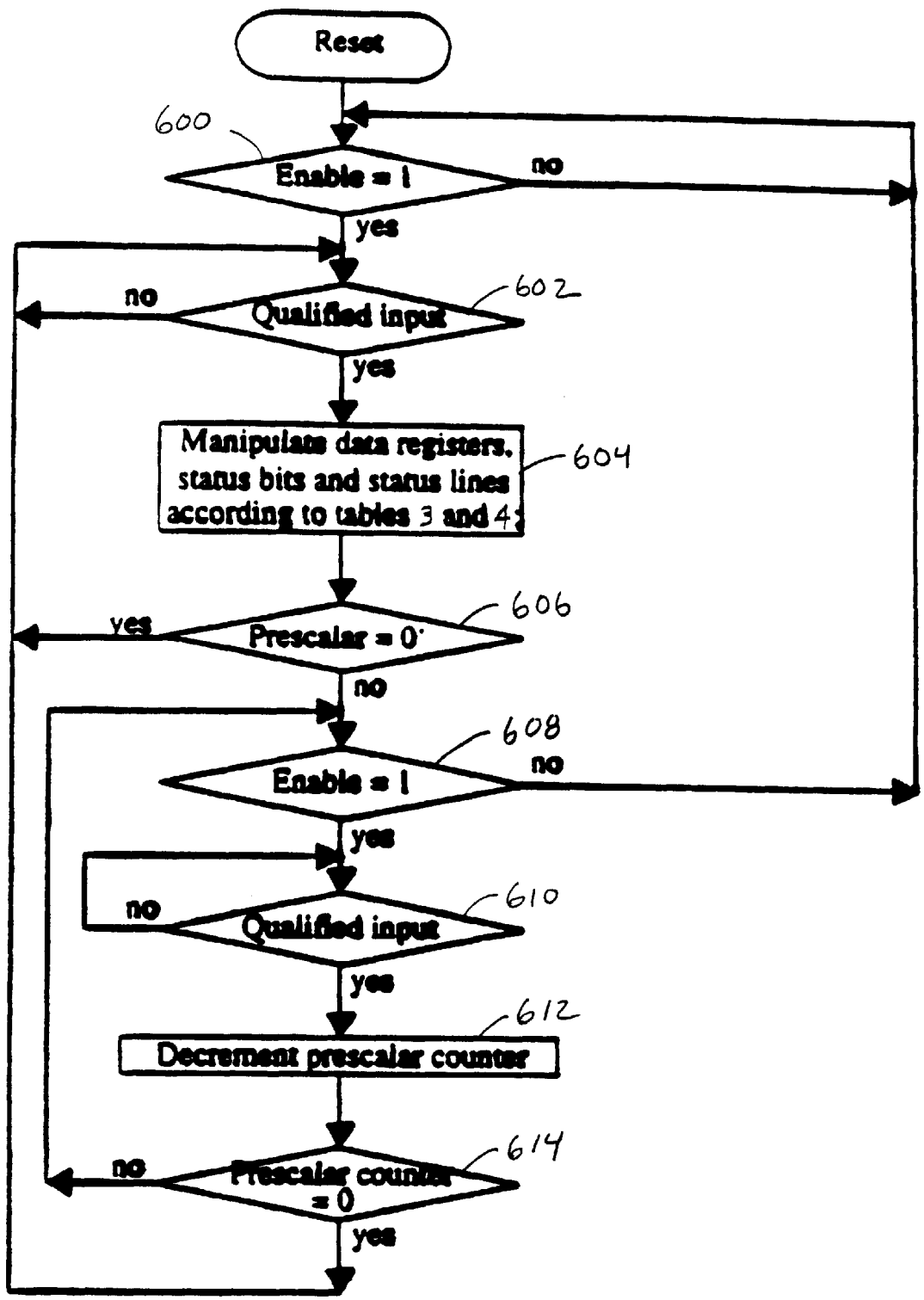
FIG. 13 is a logic flow diagram of the slot operation in HSI ode.

Referring now to FIG. 13, there is shown a logic flow diagram for a slot operation in HSI mode. The slot starts operation in HSI mode when the Enable bit in the control register is set and the Mode bit field and the control register is programmed for the HSI mode (step 600). Upon the detection of an input in step 602, the data registers, status bits and status lines are manipulated according to Tables 3 and 4 as shown in step 604.

TABLE 3

Updating of the CES Status Bit

| Present State | | |
|---|---|---|
| SC & DVOS | qualified input | Action Taken |
| Yes | | None |
| No | rising edge | set CES |
| No | falling edge | clear |

TABLE 4

Filling the FIFO in HSI Mode

| \multicolumn{4}{c}{Present State} | | |
|------|------|------|------|------|------|
| DV3S | DV2S | DV1S | DV0S | SC | Action Taken |
| 0 | | | | | Store new capture time in D3, set DV3S, if (DV3IE) toggle status line |
| 1 | 0 | | | | Store new capture time in D2, set DV2S, if (DV2IE) toggle status line |
| 1 | 1 | 0 | | | Store new capture time in D1, set DV1S, if (DV1IE) toggle status line |
| 1 | 1 | 1 | 0 | | Store new capture time in D0, set DV0S, if (DV0IE) toggle status line |
| 1 | 1 | 1 | 1 | 0 | Move contents of D2 to D3, move contents of D1 to D2, move contents of D0 to D1, store new capture time in D0, set DOVS, if (DVOIE or DOVIE) toggle status line |
| 1 | 1 | 1 | 1 | 1 | Set DOVS, if (DOVIE) toggle status line |

The logic then continues to step 606 where the prescalar field is tested. If the prescalar field is set, the Enable bit is again tested on the next pass of the sequencer in step 608 and the appropriate number of qualified input events are skipped between the capture times according to steps 610, 612 and 614.

This concludes the description of an example of operation in which the invention claimed herein is used to advantage. The multi-function timer described herein is advantageous and then its architecture can support any one of the four operating modes described herein (HSO, PWM, HSI, DTI). In one example, a relative match function can be carried out when a slot is either in HSO or PWM functional mode. Each time a slot is processed, either a rising-edge match time/angle value or a falling-edge match time/angle value is computed. These match time/angle values are compared by hardware to the current value on a time/angle reference bus (see FIG. 1). Upon the occurrence of a match, the comparator requests the output logic to generate the programmed edge event on the pin. The slot using the comparator selection bit in the control register, can generate an edge event whenever the timer bus value is greater than or equal to the reference base value. This allows the slot to immediately generate an edge event if the reference bus value is greater than or equal to the value than the slot registers at the moment slot operation is enabled, or if a new match/angle value written by the CPU to the slot registers is less than or equal to the reference bus value. Once a slot is enabled, it calculates the high time or period match time. This value is then used to perform the relative match function. For example, the period match time is equal to the time the last period match occurred as measured by the reference bus value when the slot was initially enabled, plus the period value from the data register.

Multi-function timer also supports a sample base feature. A sample base is the time interval during which qualified input events are counted and stored in a slot during the DTI functional mode. The value of this interval is in time base units. Preferably, the sample base is aligned with the qualified input event. In such a case, in DTI mode, the slot calculates the time difference (delta time) between two specified input events which are separated by a sample period (base), and counts the number of input events that occur during the sample period. The sample period begins upon the occurrence of a specified input event, at which time, the slot captures and stores the current time from the time/angle reference bus. On the first specified input event after expiration of the sample period, the slot again captures and stores the current time and then computes the delta time. The delta time is therefore the time difference between the captured time of the event at the start of the sample period and the captured time of the first event after the sample period.

From the foregoing, it can be seen that there has been brought to the art a new and improved multi-function timer which provides advantages over conventional multi-sequencer designs. While the invention has been described in connection with one or more embodiments, it should be understood that the invention is not limited to those embodiments. On the contrary, the invention covers all alternatives, modifications, and equivalents, as may be included within the spirit and scope of the appended claims. Those of skill in the art will readily recognize the applicability and flexibility provided by the present multi-function timer. In particular, the present multi-function time is well-suited to support timing applications in automotive systems such as anti-lock brake systems, automatic transmission shift schedules, fuel injector pulse management, and engine spark timing applications. From the foregoing, it can also be seen that the multi-function timer of the present invention supports asynchronous CPU accesses, i.e., read and write operations, to allow the CPU to service the timer without interfering or corrupting the operation of the timer or signals on the I/O pins. As also described in further detail above, each functional mode (HSI, HSO, PWM, DTI) supports either single or continuous operation. Each functional mode of a multi-function timer slot includes a sequence of operations. This sequence of operations, from start to end, comprises one cycle of a functional mode. In single operation, the slot, when enabled, performs one complete cycle of a selected functional mode and then stops. In continuous operation, the slot, when enabled, repeatedly cycles through its selected functional mode until the slot is disabled. Such single or continuous operation provides additional flexibility to the multi-function timer disclosed herein.

What is claimed is:

1. A multi-function timer comprising:
   a plurality of slots wherein each slot represents one of a plurality of timing processes; and
   a compute engine comprising a micro-sequencer for identifying a current slot and associated plurality of instructions representing a process, said micro-sequencer configured to serially sequence through each of said slots, and a processor for performing functions of said instructions;
   wherein each of said slots is configured to perform a process selected from the group consisting of: pulse width modulation, high speed input, high speed output, or delta time input.

2. The multi-function timer of claim 1 wherein said compute engine comprises:
   a micro-sequencer including a slot counter for identifying a current slot from said plurality of slots and for determining subsequent sequence of each of the plurality of slots for subsequent identification as the current slot, a program counter for storing a program count for each of said plurality of slots indicating the address of an executable instruction, an instruction memory storing a plurality of algorithms each providing a process, said instruction memory having a plurality of executable instructions, one of said executable instructions being designated by said program counter as the current instruction; and a processor for performing functions of said current instruction and for receiving an input and producing an output, said processor being shared to process each of said plurality of slots.

3. The multi-function timer of claim 1 further comprising an input/output controller associated with a plurality of pins wherein each of said slots is in operative communication with a pin for receiving input signals and generating output signals on said pin, and wherein said compute engine is in operative communication with a timer bus for providing a reference timing signal to perform functions of said instructions.

4. The multi-function timer of claim 1 wherein each of said slots comprises a control register including an enable bit for enabling operation of the slot upon selection as the current slot, and a mode bit for selecting the functional mode of the slot selected from the group consisting of: pulse width modulation, high speed input, high speed output, and delta time input.

5. The multi-function timer of claim 1 wherein said control register of each of said slots comprises a control bit for configuring the slot to perform a single operation of the selected function or to perform a continuous operation of the selected function upon the slot being enabled.

6. The multi-function timer of claim 1 wherein each of said slots comprises a control register for enabling the slot and for determining the slot function, a status register for storing information indicative of slot operation, and four data registers for storing data associated with the slot function.

7. The multi-function timer of claim 2 wherein said compute engine further comprises an instruction register for storing said current instruction from said instruction memory.

8. A multi-function timer comprising:
   a plurality of slots, each of said slots including a control register, status register and a plurality of data registers, each slot representing an independent process;
   a slot pointer for identifying a current slot and associated plurality of instructions representing a process, said slot pointer configured to repeatedly sequence through each of said slots;
   a logic controller in operative communication with said slots, said logic controller for reading instructions from said control registers and writing instructions to said status registers; and
   a processor for performing functions of said instructions, said processor in operative communication with said logic controller and said data registers of said slots, wherein each of said slots is configured to perform a process selected from the group consisting of: pulse width modulation (PWM), high speed input (HSI), high speed output (HSO), or delta time input (DTI).

9. The multi-function timer of claim 8 wherein each of said slots comprises a control register for enabling the slot and for determining the slot function, a status register for storing information indicative of slot operation, and four data registers for storing data associated with the slot function.

10. The multi-function timer of claim 8 wherein each of said slots comprises a control register including an enable bit for enabling operation the slot upon selection as the current slot, and a mode bit for selecting the functional mode of the slot selected from the group consisting of: PWM, HSI, HSO, and DTI.

11. The multi-function timer of claim 8 wherein said control register of each of said slots comprises a control bit for configuring the slot to perform a single operation of the selected function or to perform a continuous operation of the selected function upon the slot being enabled.

12. The multi-function timer of claim 8 wherein, in PWM mode, said slot generates a predetermined square wave, in HSI mode, said slot captures time values from a timer bus at defined input events, in DTI mode, said slot calculates a time difference between two input events and the number of input events in that time difference, and in HSO mode, said slot generates an edge event at a defined time.

13. In a multi-function timer comprising a plurality of slots, each of said slots including a control register, status register and a plurality of data registers and wherein each slot represents a timing process selected from the group consisting of: pulse width modulation (PWM), high speed input (HSI), high speed output (HSO) and delta time input (DTI), a method of processing timed events comprising the steps of:
   identifying one of the slots as the current slot with a slot pointer;
   reading said control register to identify the timing process associated with said current slot;
   identifying one set of instructions as a current set of instructions associated with said selected timing process;
   performing functions of the current instruction set associated with said selected timing process; and
   indexing said slot pointer to identify the next slot in sequence as the current slot.

14. The method of claim 13 wherein the step of performing functions of the current instruction set associated with said selected timing process, in PWM mode, includes the step of generating a predetermined square wave.

15. The method of claim 13 wherein the step of performing functions of the current instruction set associated with said selected timing process, in HSI mode, includes the step of capturing time values from a timer bus at defined input events.

16. The method of claim 13 wherein the step of performing functions of the current instruction set associated with said selected timing process, in DTI mode, includes the steps of calculating a time difference between two input events and determining the number of input events in said time difference.

17. The method of claim 13 wherein the step of performing functions of the current instruction set associated with said selected timing process, in HSO mode, includes the step of generating an edge event at a defined time.

18. The method of claim 13 further comprising the step of continuously performing functions of the current instruction set associated with said selected timing during the period which said current slot is enabled.

19. The method of claim 13 wherein the step of performing functions of the current instruction set includes performing functions of the current instruction set once during the period which said current slot is enabled.

* * * * *